US006762926B1

(12) United States Patent
Shiue et al.

(10) Patent No.: US 6,762,926 B1
(45) Date of Patent: Jul. 13, 2004

(54) SUPERCAPACITOR WITH HIGH ENERGY DENSITY

(75) Inventors: Lih-Ren Shiue, Hsinchu (TW); Chun-Shen Cheng, Kaohsiung (TW); Jsung-His Chang, Hsinchu (TW); Li-Ping Li, Taichung (TW); Wan-Ting Lo, Hsinchu (TW); Kun-Fu Huang, Taipei (TW)

(73) Assignee: Luxon Energy Devices Corporation, Taipei (TW)

( * ) Notice: Subject to any disclaimer, the term of this patent is extended or adjusted under 35 U.S.C. 154(b) by 0 days.

(21) Appl. No.: 10/249,924

(22) Filed: May 20, 2003

(30) Foreign Application Priority Data

Mar. 24, 2003 (TW) ........................................ 92106448 A (51) Int. Cl.[7] .............................. H01G 9/00; H01G 2/10
(52) U.S. Cl. ........................................ 361/502; 361/517
(58) Field of Search ................................ 361/502–503, 361/508, 509, 511, 512, 517–520, 522, 523, 524, 529, 530, 535–539, 540, 541; 174/50, 12 R, 35 R, 50.51, 58, 63, 50.53, 50.1; 220/4.02; 439/535; 248/906

(56) References Cited

U.S. PATENT DOCUMENTS

| 5,047,300 A | * | 9/1991 | Juergens ........................ 429/94 |
| 5,108,848 A | | 4/1992 | Kramer ........................... 429/9 |
| 5,223,351 A | * | 6/1993 | Wruck ............................ 429/9 |
| 5,450,279 A | * | 9/1995 | Yoshida et al. ............... 361/502 |
| 5,568,537 A | | 10/1996 | Shechet ......................... 379/58 |
| 5,637,978 A | * | 6/1997 | Kellett et al. ................ 320/104 |
| 5,796,188 A | * | 8/1998 | Bays ............................. 310/50 |
| 5,993,983 A | * | 11/1999 | Rozon ............................ 429/9 |
| 6,072,691 A | * | 6/2000 | Suhara et al. ................ 361/502 |
| 6,187,061 B1 | * | 2/2001 | Amatucci et al. ........... 29/25.03 |
| 6,215,278 B1 | * | 4/2001 | Okamura et al. ............ 320/119 |
| 6,315,918 B1 | * | 11/2001 | Mita et al. ................... 252/62.2 |
| 6,449,139 B1 | * | 9/2002 | Farahmandi et al. ......... 361/502 |
| 6,456,484 B1 | * | 9/2002 | Matsuoka et al. ........... 361/511 |
| 6,507,479 B2 | * | 1/2003 | Saito et al. .................. 361/502 |
| 6,510,043 B1 | * | 1/2003 | Shiue et al. ................. 361/502 |

* cited by examiner

*Primary Examiner*—Dean A. Reichard
*Assistant Examiner*—Eric Thomas
(74) *Attorney, Agent, or Firm*—Jiang Chyun IP Office (57) ABSTRACT

The energy content of supercapacitor is determined by its capacitance value and working voltage. To attain a high capacitance and a high voltage, several pieces of electrodes and separators are spirally wound with edge sealing to form a bipolar supercapacitor in cylindrical, oval or square configuration. While the winding operation effectively provides a large surface area for high capacitance, the bipolar packaging instantly imparts a unitary roll a minimum working voltage of 5V on using an organic electrolyte. The bipolar roll is a powerful building block for facilitating the assembly of supercapacitor modules. Using containers with multiple compartments, as many bipolar rolls can be connected in series, in parallel or in a combination of the two connections to fabricate integrated supercapacitors with high energy density as required by applications.

20 Claims, 5 Drawing Sheets

SUPERCAPACITOR WITH HIGH ENERGY DENSITY

CROSS REFERENCE TO RELATED APPLICATIONS

This application claims the priority benefit of Taiwan application serial no.92106448, filed on Mar. 24, 2003.

BACKGROUND OF INVENTION

1. Field of the Invention

The present invention is related to the fabrication of bipolar supercapacitor that is spirally wound with edge sealing, and in particular to the fabrication of supercapacitor modules comprised of a plural number of supercapacitor rolls disposed in the compartments of a container to provide powers of high voltages and high currents.

2. Description of the Related Art

Battery is the most commonly used portable device of energy storage and energy supply. In the use of battery, two functional criteria of the device, that is, use-time and power output determine the practicality of battery, especially in vehicular applications. For attaining a long use-time, the electrodes of battery are generally in a large mass, otherwise, a new electrode material must be developed and verified as in the battery evolution from lead-acid to lithium batteries. Contrary to the thick-electrode strategy, thin electrodes are employed for battery to deliver high power output as taught in U.S. Pat. Nos. 5,047,300; 5,108,848; 5,223,351 and 5,993,983. In the first three patents of the afore-listed, both thick and thin electrodes are incorporated within the same battery case. Battery of thin metal film is utilized in patent '983 for being attached to an existing battery as a power booster. Similar attached-type of power assistant is revealed in U.S. Pat. Nos. 5,568,537; 5,637,978 and 5,796,188. Charge and discharge of battery have always involved chemical reactions, consequently, the power output of battery is inherently limited by the reaction rates. In terms of response time, chemical reactions are slower than physical processes. Therefore, the power output of battery is inferior to that of capacitor for the latter depending on physical process such as charge accumulation or surface adsorption for energy storage. Capacitor is logically a better booster than thin-electrode batteries to the thick-electrode batteries, and the use-time of the latter can be prolonged as well.

Similar to the power density is a deficiency of battery, capacitor has its own shortfall in energy density. Ironically, it is the same physical process imparting capacitor high power density that causes low energy density for the capacitor. It may be described as "easy come easy go". The energy content of capacitor can be calculated by equation (1)

$$E=(½)CV^2 \quad (1)$$

where E is the stored energy in joule (J), C is capacitance in farad (F), and V is working voltage of capacitor in volt (V). Apparently, by increasing both the values of C and V, the energy content of capacitors is augmented. Because of the power of 2, V has a larger effect then C on improving the energy density of capacitor. Next, the capacitance value (C) of capacitor can be calculated through equation (2). Equation (2) depicts that C is proportional to the dielectric constant (K) of electrode material of capacitor and the electrode area (A) in square meter, and inversely proportional to the distance between electrodes (D) in meter.

$$C=KA/D \quad (2)$$

In order to enhance the value of C, electrode materials with high K values are developed, and the surface area of electrode (A) is enlarged by etching or other means, while the spacing between the electrode (D) is minimized through tight packaging of the electrodes. Supercapacitor is one kind of electrochemical capacitor that utilizes materials with tremendous surface area such as carbonaceous material, or a metal oxide with catalytic activity to store electric energy via physical processes at the interface of electrode and electrolyte. Besides supercapacitor, there are other names invented to describe capacitors with large capacitance values, for example, the device used carbonaceous material is called electric double layer capacitor (EDLC), while metal-oxide one is ultracapacitor. Given large surface area, supercapacitor can store static charge up to several thousands of farad.

Though supercapacitor may contain a large value of capacitance, the voltage built across two electrodes, that is, the anode and the cathode, ranges only from 1.0 V to 3.0 V depending on whether an aqueous solution or an organic solution is employed as the electrolyte for the capacitor. As a matter of fact, the low working voltages of supercapacitor correspond to the decomposition voltages of the solvents of the electrolyte used for the capacitor. Generally, the organic electrolytes offer higher working voltages than the aqueous counterpart at the expense of conductivity. While new electrolyte systems are being widely developed to elevate their withstanding voltages, the working voltage of supercapacitor is conveniently and instantly promoted through series connections. There are two ways to achieve the series connection for supercapacitor, one of them is to integrate plural electrodes into a single capacitor as disclosed in U.S. Pat. Nos. 5,450,279; 5,955,215; 6,005,764; 6,187,061; 6,449,139 and 6,507,479, the other is to assemble plural individual capacitor units after encapsulation into a power module as revealed in U.S. Pat. Nos. 6,072,691 and 6,215,278. All of the U.S. Patents cited above are incorporated herein by reference. In-cell connection of plural electrodes presents several advantages over the series connection of multiple encapsulated units: 1) only one casing is employed versus plural containers for the latter, 2) short cable, or no connecting cable in some cases, versus long electrical cables for the latter, 3) one-time encapsulation versus multiple operations for the latter, and 4) homogenized internal resistance or equivalent series resistance (ESR) versus diversified ESRs among the units of the latter. For in-cell series connection of the electrodes, an effective and economic method is the utilization of bipolar electrode. The forgoing electrode is an electrode that can serve simultaneously as positive and negative electrodes. In other words, one side of the bipolar electrode carries positive polarity and the other side negative. Structurally, the bipolar electrode is created by confining electrolyte within two electrodes of a unit cell with no communication of electrolyte between cells. Henceforth, the minimum number of electrodes of a bipolar packaging is three, wherein the first and third electrodes are anode and cathode, respectively, and the middle one is the bipolar electrode. Using the bipolar design, two unit cells are connected in series without connecting wire to form a single package, and less material is consumed to attain the same operation voltage as that provided from series connection of two encapsulated capacitor individuals. This will be elaborated in the detailed description of the invention.

Two prior arts, for example, U.S. Pat. Nos. 5,450,279 and 6,005,764, have utilized the bipolar design to assemble their capacitors. Nevertheless, both works rely on stacking of electrodes to construct the capacitors. Patent '279 also employs separator bag, embedded separator and embedded current collector for the bipolar effect, whereas patent '764 uses painstaking piling of numerous unit cells, for example, 100 pairs of anode and cathode for a working voltage of 100V. Assembly of cells by the stacking approach requires many processing steps at manufacturing, which will reduce the throughput while increase the cost. Furthermore, after the electrodes are stacked, the whole stack is often secured by two end plates in conjunction with bolts and nuts resulting in a bulky and heavy device. Supercapacitor should be fabricated through easy preparation of the unitary cell, followed by simple assembly and packaging to meet the application needs. When the cost of supercapacitor can be controlled by simple and productive fabrication, together with just-enough use of material, the capacitor may be widely accepted.

SUMMARY OF INVENTION

Supercapacitor is a versatile energy-storage device, yet it receives incommensurate attention in the industries. Unit price and electrical performance are the two major causes that prevent supercapacitor from prevalence. Accordingly, an object of the present invention is to fabricate supercapacitor with sufficient energy density in a single package to fulfill application requirements. Integration of the required number of unit cells into one piece of the desired device at the fabrication stage involves lower cost and less hustle than post conjunction of encapsulated capacitor individuals. Furthermore, such integration will offer end users a lot of convenience.

Another object of the present invention is to use spiral winding of as needed electrodes and separators into a cylindrical, oval or square roil of unitary supercapacitor. Each unit capacitor is prepared in the right size to yield sufficient capacitance as demanded by applications, as well as in an adequate configuration for the highest space utilization of the capacitor housing. Comparing to stacking, winding can generate high surface area for the unitary supercapacitor in one step of operation. Using automatic machineries, the winding operation can produce supercapacitor at a high throughput so that the products have commercial viability.

Still another object of the present invention is to employ bipolar packaging for promoting the working voltage of unitary supercapacitor. There are four applications of edge sealing at four different stages of spiral winding of the electrodes and separators using a curable polymer. Not only the edge sealing can confine the electrolytes within two electrodes of every unit cell, but also it can insulate the electrodes to prevent electric shorts or electrochemical reactions, so that the leakage current (LC) of capacitor may be reduced. As the electrodes are fixed through edge sealing, convulsion damage of the electrodes at charging and discharging of the capacitor may be minimized.

Yet another object of the invention is to place as needed number of unitary supercapacitors in a container with as needed number of compartments so that the individual units can be integrated into a single device with sufficient energy density. When the power load of an application is determined, the number, as well as the dimension, of the compartments of capacitor housing can then be decided. Correspondingly, the unitary supercapacitors are fabricated and assembled in the container to meet the application need without undue wasting of material. There is no restriction on the shape of container to house the unitary supercapacitors as long as the integrated supercapacitor can fit the space of application.

Still yet another object of the invention is to employ a curable potting material to hermetically seal the capacitor housing to complete the integration of unitary supercapacitors. In conjunction with the edge sealing, potting should collectively and effectively assist the electrodes against convulsion damages from mechanical movements induced during charge and discharge of the supercapacitors. Many potting materials can provide a mechanical strength comparable to that offered by bolts and nuts. Nevertheless, the potting operation is easier and quicker than the screwing, and the former also presents a permanent fastening.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
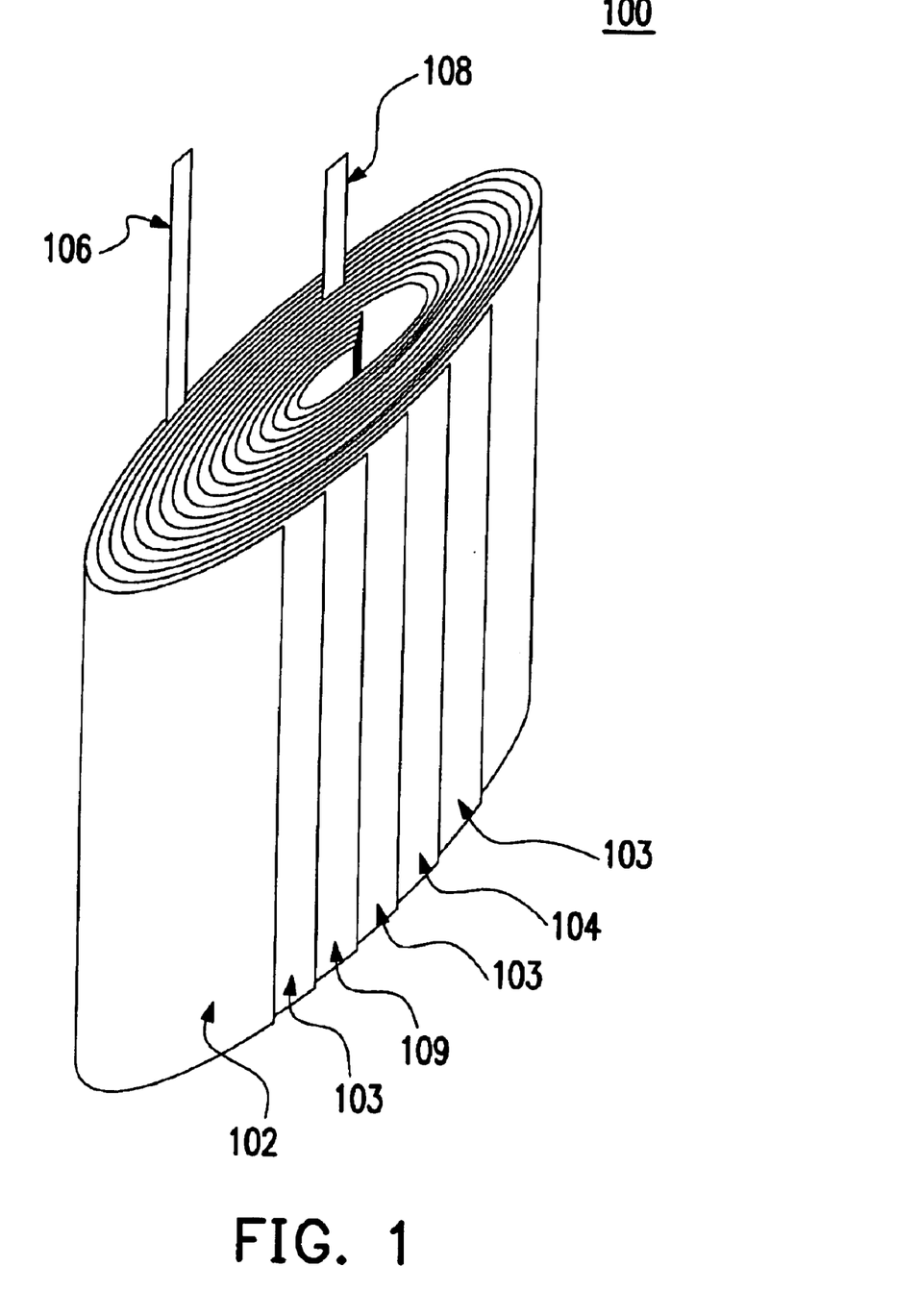
FIG. 1 depicts a typical roll of spirally wound supercapacitor containing 2 sheets of electrodes and 2 sheets of separators according to a preferred embodiment of the invention.

Supercapacitor development has actively been continued in two areas, one is the upgrading of the device, the other is innovative applications of the capacitor. Without potent and affordable supercapacitors, the applications can't be realized. There are a lot of efforts devoted to improve the energy of the device. Both capacitance and voltage must collectively reach their respective minimal levels as defined by a load, otherwise, the supercapacitor is unable to drive that load. However, unitary supercapacitors are commonly fabricated to operate under a voltage of 3.0V, or 2.3 to 2.5V to be exact, whereas the capacitance value of capacitor may exceed 1000F. Many applications, for example, memory backup of computers and internal-combustion engines of vehicles, require a driving voltage higher than 3.0V yet less than 1000F in capacitance need. This is the dilemma for users that two 2.5V capacitors have to be connected in series for works that only demand 3.0 or 3.3V. Not only the cost is high, but there may not be enough room for two capacitors. It will be quite beneficial by raising the working voltage of unitary supercapacitor from 2.5 to 5.0 V. Through an ingenious packaging, a unitary supercapacitor can easily attain a working voltage of 5.0V and higher on using less material than the conventional assembly. FIG. 1 shows a preferred embodiment of the invention, therein an elongated square roll 100 is formed by spirally winding of one anode 102 and one cathode 104 along with two separators 103. Each of the two electrodes is also attached, by spot welding or crimping, an electric lead such as the anode lead 106 and cathode lead 108. Incidentally, FIG. 1 also illustrates the basic architecture of conventional supercapacitor fabricated by concentric winding, wherein two electrodes and two separators are employed as well. Electrodes 102 and 104 are most easily prepared by roller coating of a paste of economical and active material, such as activated carbon, $Fe_3O_4$, $MnO_2$ or NiO, on an economical substrate, such as aluminum foil at 20 to 100 μm thickness, followed by thermal drying. Porous material such as Manila paper, polyethylene (PE) or polypropylene (PP) of 20 to 100 μm thick may be employed as the separator to prevent shorts, also to contain electrolyte. After the jelly roll 100 is impregnated with an electrolyte, for example, 1M tetraethylammoniun tetrafluoroborate $((C_2H_5)_4NBF_4)$ in propylene carbonate (PC), the as prepared capacitor can be charged to a working voltage of 2.5V, whereas the capacitance value of the capacitor is determined by the surface area, or the length and width of electrodes enclosed in the jelly roll 100.

As seen in FIG. 1, there is a separator sheet placed after every electrode foil so that electrical short can be prevented. On inserting one electrode 109 and another separator 103 to the location after the separator 103 adjacent to the cathode 104, along with edge sealing applied at four sides of roll during or after the winding operation, a bipolar supercapacitor in unitary roll is then created. At the beginning of spiral winding of three electrodes and three separators, the starting ends of the six sheets are bound using a curable polymer, for example, epoxies, polyacrylates, polyurethanes or polyesters. This constitutes the first edge sealing of the bipolar packaging. Next, after the winding operation is completed and the roll is secured by a tape, the very ends of the six sheets are bound again with the same sealant to create the second edge sealing. Subsequently, the bottom of the roll is sealed using the polymer, while the top end of the roll with the protruding leads is sealed after an electrolyte is injected to soak the separators. Curing time of the edge sealant can be adjusted by modifying the sealant formulation. Thereupon, the electrolyte is confined within the roll by the edge sealing, and the resulted capacitor can be operated at 5.0V on using 1M $(C_2H_5)_4NBF_4$/PC or other suitable organic solutions as the electrolyte. In reality, the above operation of edge sealing has turned two unit cells connected in series within in the unitary roll without using a connecting wire. In correspondence to anode 102, the facing side of the middle electrode 109 functions as a cathode, while the other side of the same electrode is functionally an anode to cathode 104. Because of two different polarities residing on the middle electrode 109, it is called bipolar electrode. All three electrodes, anode, cathode and bipolar electrode, are fabricated identically. If more bipolar electrodes 109 are incorporated between anode 102 and cathode 104, a unitary supercapacitor is capable of working at voltages above 5.0V.

A 5.0V bipolar supercapacitor of wound type is consisted of three sheets of electrodes and three sheets of separator in one container. To attain the same working voltage of 5.0V, two conventional supercapacitors of 2.5V each must be connected in series using a connecting wire. Combining the two conventional capacitors, the package consumes four electrodes and four separators, as well as two containers. Henceforth, the bipolar packaging uses less material than the conventional way for constructing the supercapacitor of 5.0V working voltage. Furthermore, due to the fact that separator contains most of the electrolyte and the electrolyte is the most expensive component of supercapacitor, more separators employed will lead to higher material cost for the supercapacitor. One more advantage of the bipolar packaging is that the edge sealing can also insulate the substrate metal, aluminum in the invention, which may be exposed during fabrication so that leakage current of supercapacitor may be reduced from preventing the bare metal to react with any active contaminant, for example, water, which may be present in the system.

Figure 2:
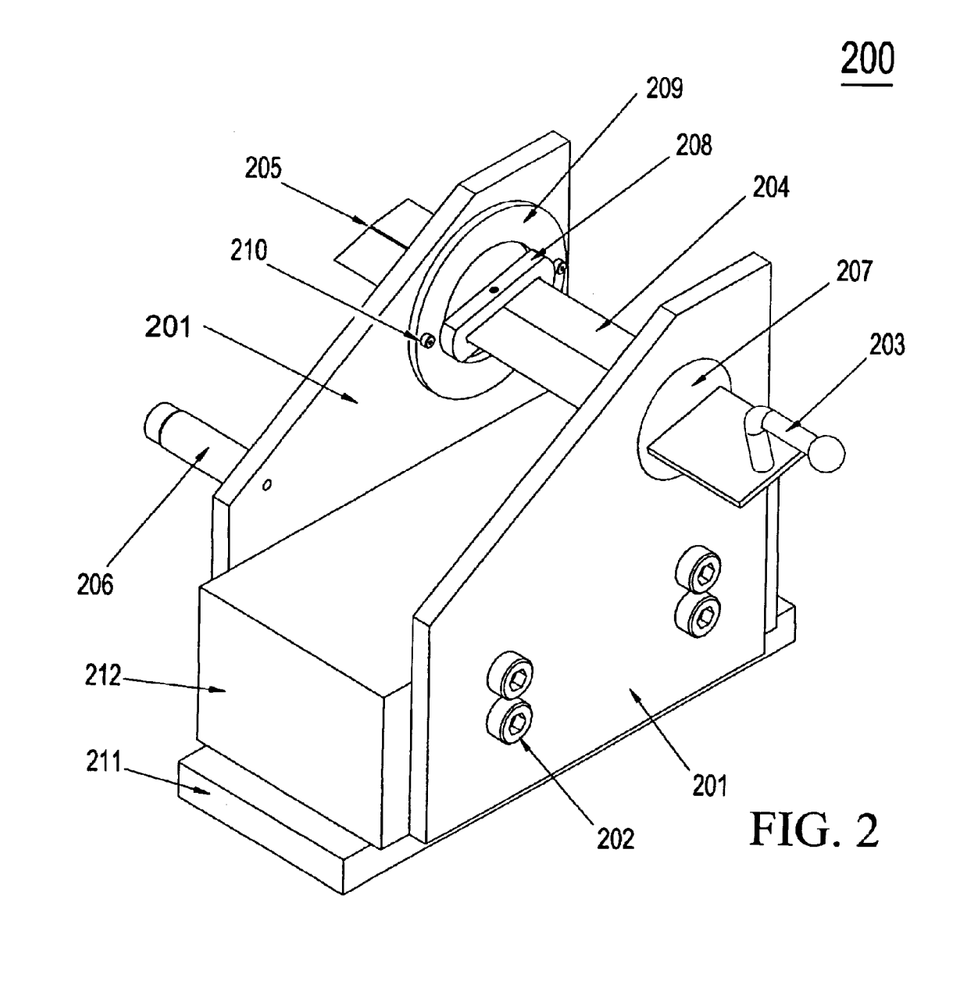
FIG. 2 depicts a manual winder that can yield an elongated square roll of electrodes according to the preferred embodiment of the invention.

FIG. 2 demonstrates a manual winder 200 for fabricating a supercapacitor roll such as 100. Without specifying the dimensions, winder 200 is made of a metal block 212 as the main body sitting atop an anvil 211 that can be secured to a desk top (securing nuts are not shown). There are two walls represented by 201 attached to the body block 212 via hexagonal screws designated as 202. Ruler 204 is equipped with a cranking handle 203 for manual rotation, and a slit 205 for holding the starting ends of electrode and separator sheets. Using the rotating plate 207, baffle 209, the setting bar 208 and securing screws designated as 210, the ruler 204 can be disposed firmly across the walls of winder 200. While slit 205 is holding the electrodes and separators, in conjunction with a tension produced by hand gripping the foregoing sheets the guiding pole 206 can assist the multiple sheets to form a tidy jelly roll. As the winding operation is complete, the roll can be released by pulling the handle 203 towards the right hand side. Application of a sealant for edge sealing, as well as tapping the roll for compression are conducted manually. Nevertheless, all of the manual operations including winding, edge sealing, electric-lead binding and tapping can be automated. Manual winder 200 is used herein to provide an easy elucidation of the objects of the invention rather than claiming the winder as a mass production tool. Both of the diameter, that is, length in the longer direction, and height of the capacitor roll such as 100 are determined by the width and length of the left section that is outside the left wall of the winder, of ruler 204, respectively. The third dimension of the jelly roll such as 100, or the roll thickness, can be easily controlled by the number of rotation of the cranking handle 203, and the thickness of the roll in turn decides the capacitance value of the capacitor fabricated.

Figure 3:
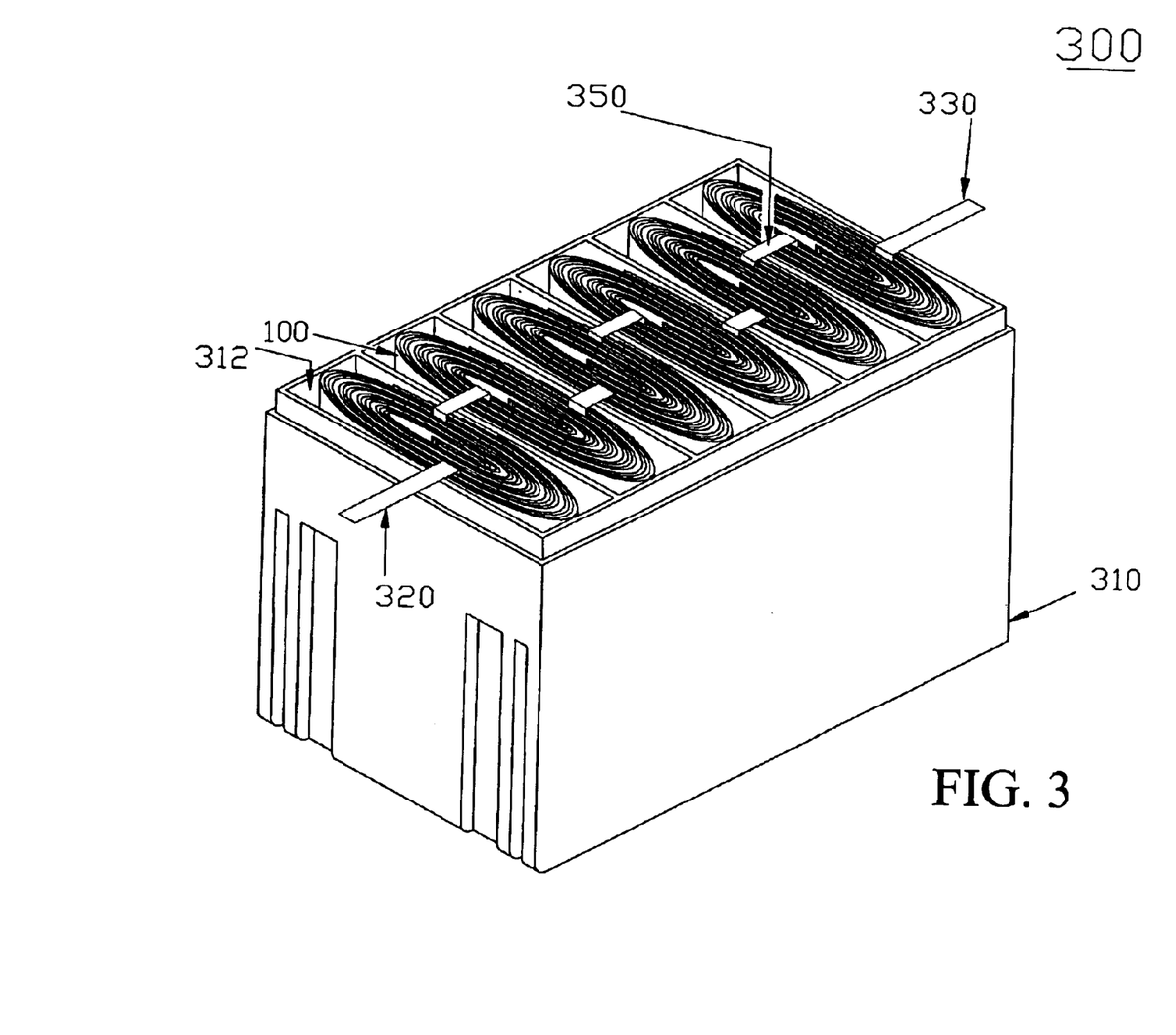
FIG. 3 depicts six unitary rolls disposed in the six compartments of a container, therein the rolls are connected in series according to another preferred embodiment of the invention.

FIG. 3 illustrates another preferred embodiment of supercapacitor with high energy density 300 in accordance to the present invention. Supercapacitor 300 utilizes a conventional box-like container 310 of lead-acid battery with six compartments represented by 312. Each compartment is disposed as an elongated square roll represented by 100 that is fabricated using a manual winder such as the one illustrated in FIG. 2. Every capacitor roll is fabricated to attain the maximum utilization of the space of each compartment. Subsequently, the six capacitor rolls are connected in series through connecting cables represented by 350 to form the high energy-density module 300. Including the leads 320 and 330 served as anode and cathode, respectively, all the connecting cables should be capable of carrying large currents, for example, hundreds ampere (A). If the capacitor rolls 100 are conventional type using an organic electrolyte, supercapacitor 300 may be operated at 15V. However, when the capacitor rolls 100 fabricated by the bipolar packing, then supercapacitor 300 can be operated at 30V, yet its capacitance value will be lower than that contributed by conventional capacitor rolls. Considering equation (1), the electrode gap (D) is increased n folds when n pieces of equal-capacitance capacitors are connected in series, thus the overall capacitance equals to the capacitance of an individual capacitor divided by the number (n) of capacitors to form the pack. Using the same material system & electrode surface area, a bipolar supercapacitor containing one bipolar electrode should have at least half of the capacitance value of a non-bipolar counterpart.

On the other hand, with twice value in working voltage, the bipolar supercapacitor will have twice energy content of the non-bipolar one according to equation (2). While the material developments require lengthy time and costly works to succeed in promoting the working voltage of supercapacitor, series connection is an instant means to improve the working voltage of the capacitor. Series connection, however, often impairs the reliability of a system wherein the comprising components are in tandem configuration. If one component fails, the entire system will immediately break down. Therefore, the series connection should be conducted using as fewer components and connecting elements as possible. Bipolar design of the invention can serially connect two unit cells in one package just by means of a piece of bipolar electrode, and the working voltage is doubled comparing to the non-bipolar counterpart. The bipolar device is a building block that may facilitate further series connection to higher working voltages as illustrated in FIG. 3. By laying a cover 420 over the top of case 310 that is now 310 in FIG. 4, an encapsulated supercapacitor 400 with high capacitance value and high working voltage is fabricated in accordance to the invention. On the cover 420, there is a positive stud terminal 430, as well as a negative stud terminal 440, which are electrically connected to leads 320 and 330, respectively, for delivering various powers to miscellaneous loads. Both cover 420 and case 410 are made of an elastic material, for example, PE, PP, reinforced PE or reinforced PP. When a sealant is applied to the bottom of bipolar rolls 100 for edge sealing, the sealant may be also deposited in each compartment of case 310 so that the capacitor elements are fixed at a permanent position. Through edge sealing and fixture, the composing elements of supercapacitor 400 may be protected from convulsion damage during change and discharge of the capacitor. Instead of using bolts and nuts, cover 420 and case 310 may be consolidated via a potting material that is similar to the edge sealant aforementioned. Besides the required capacitance values and working voltages, the supercapacitor should also possess a low value of ESR for supporting an application. A high value of ESR can depreciate the power output of supercapacitor below the driving level. Compacting the supercapacitor electrodes through concentric winding, edge sealing and fastening may collectively minimize the ESR of capacitor. Thereby, the invention provides fabrications of cylindrical, oval or square supercapacitors with capacitance values equal to or above 1F and working voltages equal to or above 5V, as well as ESR under 30 mΩ.

The following example using spiral winding and container with multiple compartments is given only to demonstrate, rater than limiting, the fabrication of high energy-density supercapacitor in accordance with the invention.

EXAMPLE

Figure 4:
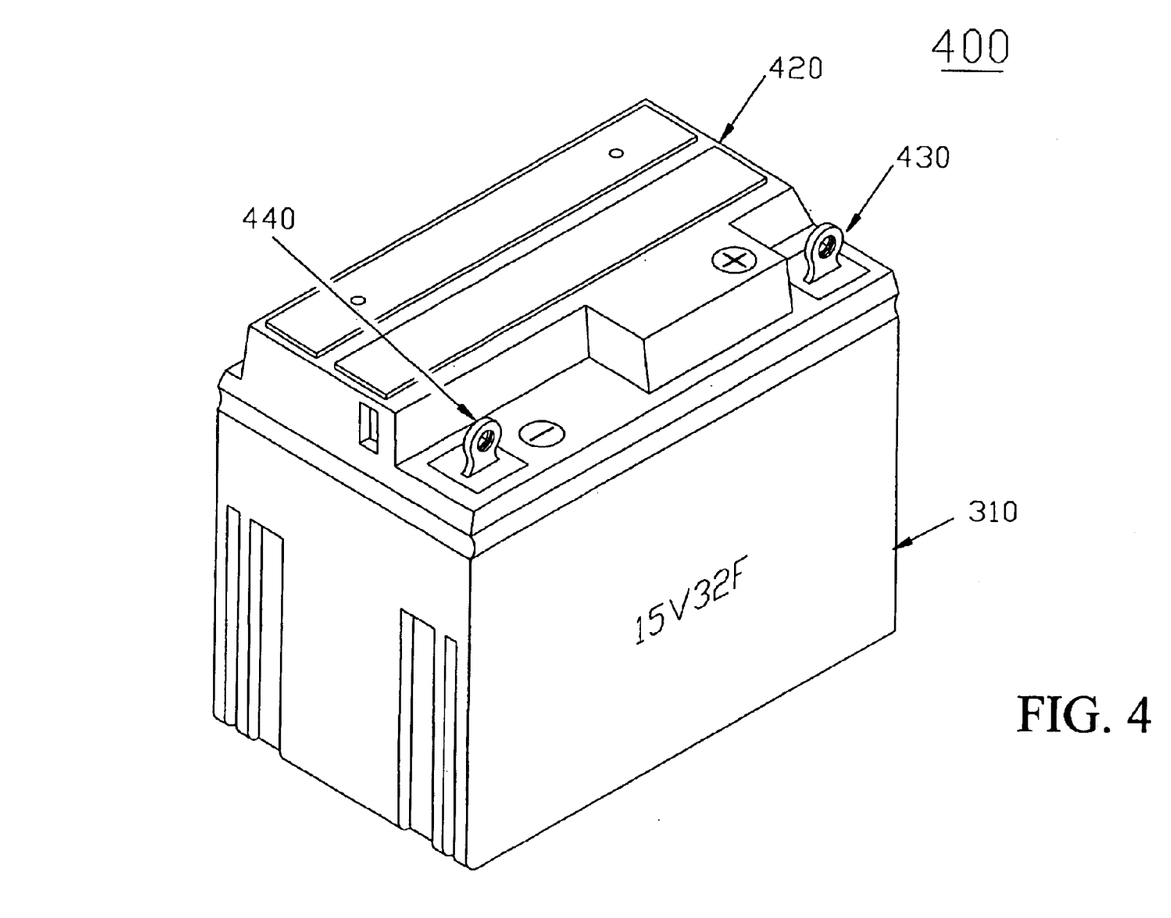
FIG. 4 depicts an integrated supercapacitor that has high capacitance value and high working voltage according to a preferred embodiment of the invention.
Figure 5:
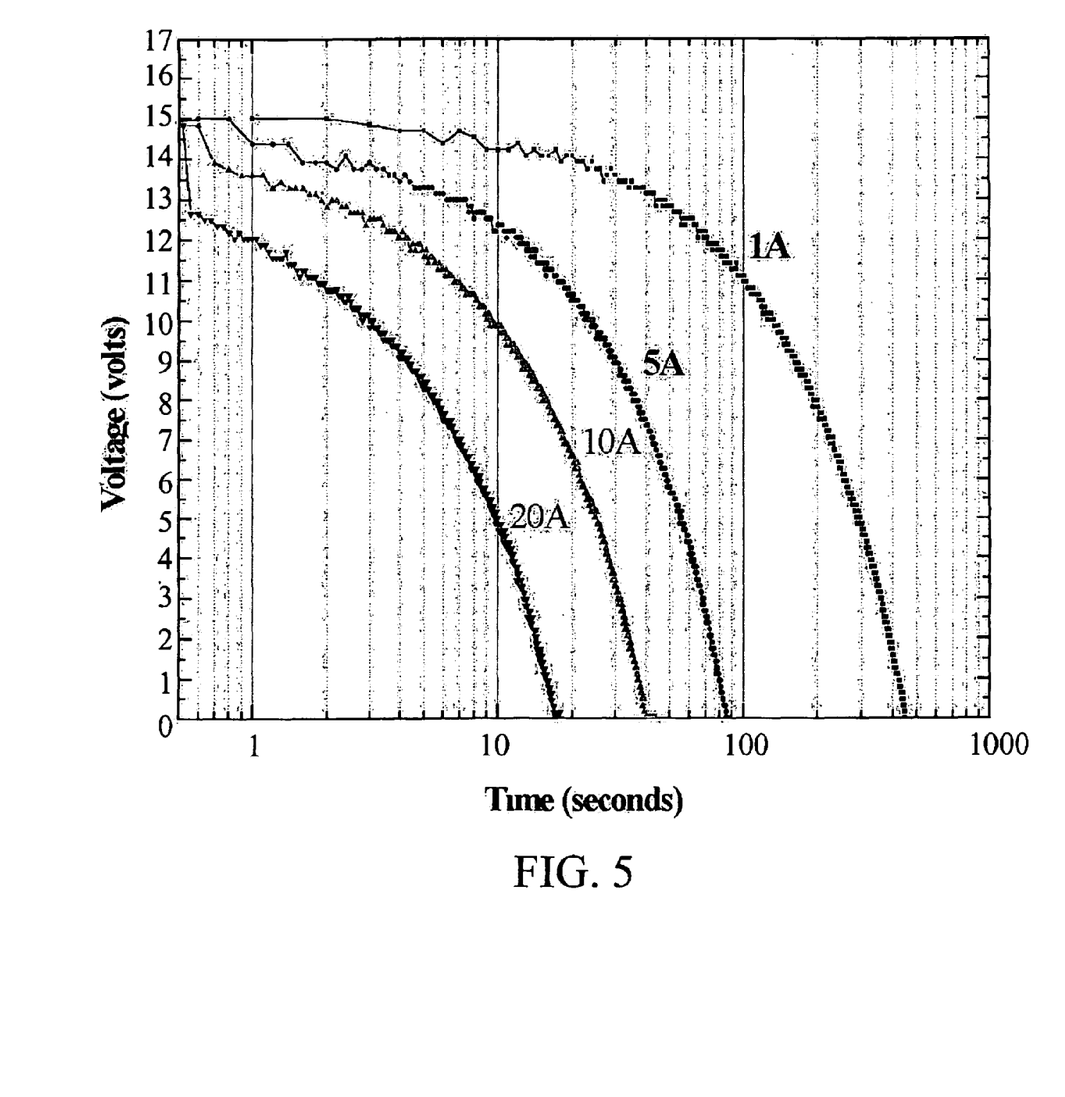
FIG. 5 is the discharging curves at four different discharging rates of an exemplary supercapacitor as illustrated in FIG. 4.

Six elongated square rolls are prepared on the manual winder as shown in FIG. 2. A six-cell lead-acid case that has a length of 11 cm, width of 6.6 cm, height of 8.5 cm, and each compartment of 1.6×6.3×7 cm is used to house the capacitor rolls. Every capacitor roll is comprised of 2 electrodes and 2 separators at a size to snugly fit the compartment. After the capacitor rolls are impregnated with 1M $(C_2H_5)_4NBF_4$/PC, the rolls are serially connected and encapsulated to form a supercapacitor of 15V×32F as indicated in FIG. 4. Though the supercapacitor is primitively fabricated through manual operation, it yields nice discharge curves at four different discharge rates as shown in FIG. 5. At a total weight of 550 g and a measured peak current of 170A, the supercapacitor as fabricated has an experimental power density of 4.6 KW/Kg that is sufficient for many applications including jump start of automobiles.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A high energy-density supercapacitor, comprising:
   an anode;
   a cathode;
   at least one bipolar electrode interposed between the anode and the cathode;
   a plurality of separators disposed after the anode, the cathode and the at least one bipolar electrode, respectively; and
   an electrolyte impregnating the separators, wherein
   the anode, the cathode, the at least one bipolar electrode and the separators are spirally wound to form a jelly roll with an electric lead attached to the anode and a separate electric lead attached to the cathode, wherein the jelly roll is sealed at starting ends of all electrodes and separators, at very ends of all electrodes and separators, at a top of the jelly roll, as well as at a bottom of the jelly roll using a curable polymer.

2. The high energy-density supercapacitor according to claim 1, wherein the electric leads attached to the anode and the cathode are at the top of the jelly roll.

3. The high energy-density supercapacitor according to claim 1, wherein the jelly roll is edge sealed at four sides.

4. The high energy-density supercapacitor according to claim 3, wherein an edge sealant for sealing edges of the jelly roll comprises one selected from the group consisting of epoxies, polyacrylates, polyurethanes and polyesters.

5. The high energy-density supercapacitor according to claim 3, wherein the bipolarity of the at least one bipolar electrode is created by edge sealing, and no electric lead is attached to the the at least one bipolar electrode.

6. The high energy-density supercapacitor according to claim 1, wherein the high energy-density supercapacitor is operated at voltages equal to or above 5V, with a capacitance value equal to or above 1F and an equivalent series resistance (ESR) value below 30 mΩ.

7. The high energy-density supercapacitor according to claim 1, wherein the electrolyte impregnating the separators comprises an organic electrolyte.

8. The high energy-density supercapacitor according to claim 1, wherein the jelly roll is in a cylindrical, oval or square configuration.

9. The high energy-density supercapacitor according to claim 1, further comprising:
   a plurality of said jelly rolls; and
   a multiple-compartment container for containing the jelly rolls, wherein each jelly roll is disposed in a compartment of the multiple-compartment container for series connection, parallel connection or a combination of the two.

10. A high energy-density supercapacitor, comprising:
a plurality of capacitor rolls, each comprising
   an anode;
   a cathode;
   a bipolar electrode;
   a plurality of separators disposed after the anode, the cathode and the bipolar electrode, respectively; and
   an electrolyte impregnating the separators, wherein the anode, the cathode, the bipolar electrode and the separators are spirally wound to form a jelly roll with an electric lead attached to the anode and a separate electric lead attached to the cathode; and
   a multiple-compartment container for containing the jelly rolls, wherein each jelly roll is disposed in a compartment of the multiple-compartment container for series connection, parallel connection or a combination of the two.

11. The high energy-density supercapacitor according to claim 10, wherein the electric leads connected to the anode and the cathode of each jelly roll are at the same end of the jelly roll defined as a top of the jelly roll.

12. The high energy-density supercapacitor according to claim 10, wherein each jelly roll is sealed at starting ends of all electrodes and separators thereof, at very ends of all electrodes and separators thereof, at the top thereof, as well as at a bottom thereof using a curable polymer.

13. The high energy-density supercapacitor according to claim 12, wherein each jelly roll is edge sealed at four sides thereof.

14. The high energy-density supercapacitor according to claim 13, wherein an edge sealant for sealing edges of each jelly roll includes one selected from the group consisting of epoxies, polyacrylates, polyurethanes and polyesters.

15. The high energy-density supercapacitor according to claim 10, wherein the electrolyte impregnating the separators comprises an organic electrolyte.

16. The high energy-density supercapacitor according to claim 10, wherein the multi-compartment container has at least two compartments.

17. The high energy-density supercapacitor according to claim 16, wherein the container has two detachable parts including a cover and a base, wherein the cover is for hermetic sealing, and the base is for containing the capacitor rolls in the compartments therein.

18. The high energy-density supercapacitor according to claim 17, wherein all parts of the container are made of a material selected from the group consisting of PE, PP, reinforced PE and reinforced PP.

19. The high energy-density supercapacitor according to claim 17, wherein the cover and the base are consolidated by a potting material.

20. The high energy-density supercapacitor according to claim 16, wherein the device formed by series connection of plural number of capacitor rolls in the container is operated at voltages equal to or above 5V, with a capacitance value equal to or above 1F and an equivalent series resistance (ESR) value below 30 m$\Omega$.

* * * * *